May 14, 1946.   J. H. WIGGINS   2,400,450
LIQUID SEALED VENT VALVES
Filed May 4, 1944

INVENTOR;
JOHN H. WIGGINS
BY
ATTORNEY

Patented May 14, 1946

2,400,450

UNITED STATES PATENT OFFICE 2,400,450

LIQUID SEALED VENT VALVES

John H. Wiggins, Chicago, Ill.

Application May 4, 1944, Serial No. 534,110

6 Claims. (Cl. 137—53)

This invention relates to liquid sealed vent valves of the general type wherein the control element of the valve co-acts with a seat that rises upwardly through the sealing liquid during the opening operation of the controlling element, for the purpose of preventing or reducing entrainment of the sealing liquid with the gaseous medium flowing past the control element when said control element opens or separates from its seat.

One object of my present invention is to provide a liquid sealed vent valve of the general type or kind mentioned, that is equipped with a means which co-acts with the rising seat to eliminate the possibility of the gaseous medium flowing at a high velocity in contact with the surface of the sealing liquid, when the control element opens or separates from its seat.

Another object is to provide a liquid sealed vent valve of the type that is equipped with a rising seat for the control element, which is of such design or construction that the buoyancy or specific gravity of the sealing liquid, is not utilized or relied upon to hold the seat in contact with the control element, or to cause the seat to rise or move upwardly with the control element, during the opening operation of the control element.

Another object is to provide a valve of the kind last referred to, in which the means or mechanism employed to move the seat vertically, is of such design or construction that it effectively holds the seat in a level position when said seat is rising, and also functions as a guide cage for the control element during the vertical movement of said element. Other objects and desirable features of my invention will be hereinafter pointed out.

I have herein illustrated my present invention embodied in a pressure relief valve that is adapted to be used to vent a tank or container in which a gaseous medium is stored, but I wish it to be understood that my invention is also applicable to vacuum relief valves of the kind that are used for supplying air or gases to storage containers to afford vacuum relief.

Figure 2:
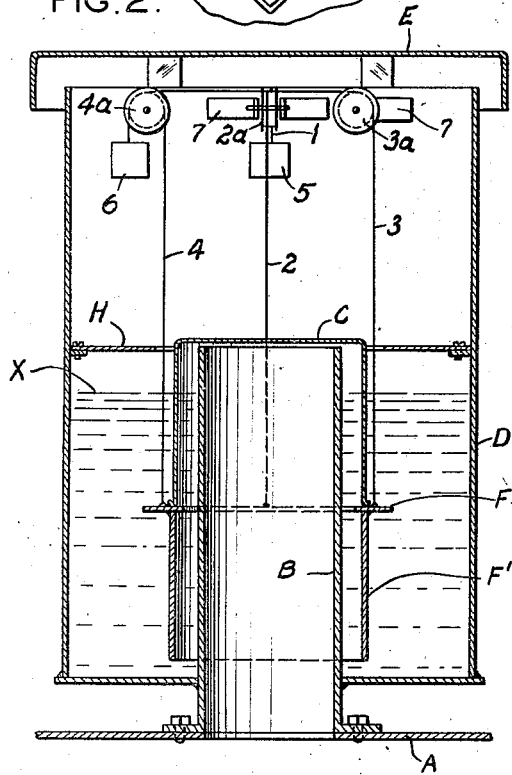
Figure 2 is a vertical transverse sectional view of said valve, showing the control element in its closed position.

In the accompanying drawing, A designates a tank or container in which a gaseous medium is stored, B designates a pressure relief outlet or duct from said container, formed usually by a vertically-disposed, open-ended, tubular member extending upwardly from an opening in the top of the container, C designates the control element of the valve, formed preferably by a substantially-inverted, cup-shaped member mounted on the upper end of the pressure relief duct or outlet B, and D designates a receptacle that holds a body of sealing liquid $x$ in which the lower end portion of the control element C is submerged when said control element is in its closed position, as shown in Figure 2. The receptacle D is provided at its upper end with a removable cover E mounted or arranged so that the internal space of the receptacle D above the surface of the sealing liquid, is always in direct communication with the atmosphere.

Figure 3:
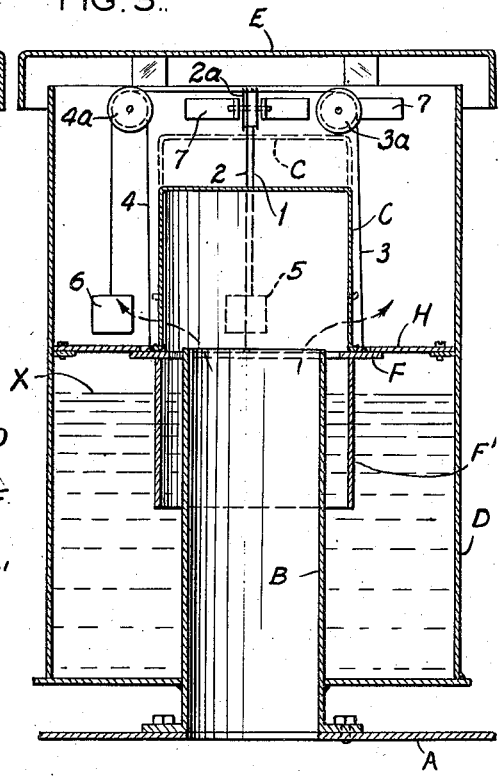
Figure 3 is a vertical transverse sectional view, illustrating the action of the control element during the opening operation of said control element.

Normally, the bottom edge or lower end of the control element C is in contact or engagement with a rising seat F, formed by a horizontally-disposed, annular-shaped surface surrounding the pressure relief duct B, and submerged in the sealing liquid $x$ at a point considerably below the surface of the sealing liquid, as shown in Figure 2, said rising seat being provided with a depending sleeve or collar F', which is of such length that a portion of said collar F' always remains submerged in the sealing liquid, even when the control element C opens to vent the gas space of the tank A. When the control element moves upwardly towards its open position, the seat F will rise through the sealing liquid, and will remain in contact with the bottom edge or lower end of the control element, until said seat reaches a position above the surface of the sealing liquid, as shown in full lines in Figure 3. Thereafter, the control element separates from the seat, or moves upwardly relatively to the seat F, as shown in broken lines in Figure 3, so as to form a space between the control element C and seat F, through which the gaseous medium can escape from the pressure relief outlet B, as indicated by the arrows in Figure 3.

In order to eliminate the possibility of the gaseous medium flowing at a high velocity over the surface of the sealing liquid, and thus causing some of the sealing liquid to be entrained in the escaping gases, when the control element opens, or separates from its seat, I arrange a horizontally-disposed baffle or shield H inside of the liquid receptacle D at a point above the surface of the sealing liquid $x$, so as to protect the sealing liquid from the escaping gases. Preferably, said baffle or shield H is attached to the side wall of the receptacle D, and said baffle is made of annular shape or form, so that it will extend continuous or unbroken around the edge of the seat F when said seat is in engagement with said baffle. It is not necessary that the shield or baffle H be connected in a gas-tight manner to the side wall of the receptacle D, but owing to the fact that it is mounted stationarily on the side wall of the receptacle, it serves as a stop, against which the seat F strikes when said seat rises during the opening operation of the control element. By constructing the valve in this manner, I obtain or produce a cover for the sealing liquid, made up of the annular shield H and the seat F, that is disposed between the surface of the sealing liquid and the point at which the gaseous medium escapes under the bottom edge of the control element C, when said control element separates from its seat, said cover functioning to prevent the escaping gases from dipping down onto the surface of the sealing liquid, and thus picking up and carrying away some of the liquid, when the control element opens. So far as this particular feature of my invention is concerned, i. e., protecting the top surface of the sealing liquid by a baffle, shield, or cover, it is immaterial how the vertical movement of the seat F is effected. For example, the buoyancy of the sealing liquid can be utilized to raise the seat or cause it to move upwardly, or a means separate and distinct from the sealing liquid can be used, as hereinafter described, to raise the seat F vertically with the control element of the valve, during the opening operation of said control element. The particular construction of said baffle, shield, or cover is also immaterial, so long as it performs the function or attains the result previously described.

Figure 1:
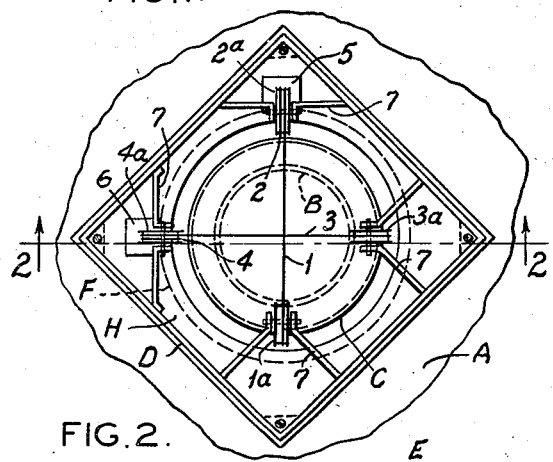
Figure 1 is a top plan view of a liquid sealed pressure relief valve embodying my present invention, with the cover of the sealing liquid receptacle removed.

Preferably, the upward movement of the rising seat F is effected by one or more counterweights arranged so as to cause the seat F to move upwardly with the control element C, during the opening operation of said control element, and to permit the said seat F to be depressed or moved downwardly by the weight of the control element C when said control element returns to its normally closed position, shown in Figure 2. Thus, as shown in the drawing, the rising seat F has attached to same, at equally separated or spaced points around the circumference of said seat, four cables, chains or other flexible members 1, 2, 3 and 4, that lead upwardly from said seat over overhead pulleys to counterweights, which exert a pull on said cables in a direction tending to raise the seat F, or move it upwardly when the control element C moves upwardly towards its open position. Four overhead pulleys 1ª, 2ª, 3ª and 4ª are employed, and the four previously mentioned cables are arranged in two pairs, each of which is combined with a counterweight. Thus, as shown in Figures 1 and 2, the cable 1 leads upwardly from the seat F over the pulley 1ª, thence horizontally from the pulley 1ª to the diametrically opposite pulley 2ª, shown in Figure 1. The cable 2 leads upwardly from the seat F and over the pulley 2ª, which is located directly above the point at which the cable 2 is attached to the seat F. The two cables 1 and 2 are attached at the same point to a counterweight 5. Similarly, the right hand cable 3, shown in Figure 2, leads upwardly to the pulley 3ª, which is located directly above the point of attachment of the cable 3 to the seat F, and after passing over the pulley 3ª, the cable 3 extends horizontally across to the pulley 4ª, which is located diametrically opposite the pulley 3ª. The cable 4, which is attached to the left hand side of the seat F (looking at Figure 2) leads upwardly over the pulley 4ª, and thence downwardly to a counterweight 6, the two cables 3 and 4 being attached at the same point to the counterweight 6. By arranging the cables and pulleys in the manner above described, I am able to use two counterweights to produce a uniformly distributed, upward pull on the seat F. The pulleys above referred to are mounted in supporting brackets 7 attached to the side wall portion of the receptacle D adjacent the upper end of same. Obviously, any other suitable type or kind of counterweighting mechanism could be employed for holding the seat F in contact with the control element C during the upward movement of said control element, and for permitting the seat F to be depressed or moved downwardly by the weight of the control element C when said control element returns to its normally closed position. In fact, so far as my present invention is concerned, any means other than the sealing liquid $x$ can be used for raising the seat F during the opening operation of the control element, as my present invention, broadly stated, consists of a liquid sealed vent valve provided with a rising seat, and a means separate and distinct from the sealing liquid and in no way dependent upon the buoyancy or specific gravity of the sealing liquid for causing the seat F to rise through the liquid in contact with the control element when said control element moves upwardly, and automatically assume a position above the surface of the sealing liquid before the control element separates from its seat to vent the gas space of the tank A.

In a structure of the kind above described the counterweighting mechanism that is used to raise the seat F effectively holds said seat in a level position while it is traveling upwardly, due to the fact that the counterweights and the cables exert a uniform upward pull on the seat F at four equally spaced points around the circumference of said seat. Moreover, said counterweighting mechanism functions as a guide cage for the control element C that effectively prevents said control element from tipping or assuming an angular position, during its rise and fall, inasmuch as said counterweighting mechanism comprises four taut, vertically-disposed cables or equivalent flexible devices that surround the control element C and form a vertical pathway in which said control element travels.

The counterweighting mechanism for the seat F is so constructed or designed that the control element C will normally remain in the position shown in Figure 2. When the pressure in the gas space of the tank A rises to a certain approximate degree, the control element C starts to move upwardly, together with the seat F, which is held in contact with the bottom edge of the control element by the pull which the cables of the counterweighting mechanism exert on the seat F. After the seat F has moved upwardly above the surface of the sealing liquid, it comes into contact with the baffle or shield H, with the result that the upward movement of the seat is arrested. The control element C, however, continues its upward movement, as indicated by the dotted lines in Figure 3, with the result that the control element separates from the seat, whereupon the internal pressure of the tank A is relieved by the gaseous medium which escapes through the space between the seat F and the bottom edge of the control element, as indicated by the arrows in Figure 3. At this time, i. e., when the control element C opens, the depending sleeve or collar F' on the seat F is still submerged in the sealing liquid, and the seat F is then in engagement with the shield or baffle H, mounted on the side wall portion of the sealing liquid receptacle D. Consequently, it is impossible for the escaping gases to flow at a high velocity over the surface of the sealing liquid and cause some of the liquid to be entrained with escaping gases. The weight of the cables 1, 2, 3, and 4 and of the counterweights 5 and 6 is so adjusted or regulated that when the internal pressure of the gas space of the tank A returns to normal, the weight, load or downward force which the control element C exerts on the seat F causes the control element C and its co-acting seat F to return automatically to the position shown in Figure 2.

In addition to effectively preventing entrainment of the sealing liquid with the escaping gases, in the operation of venting the tank, the structure above described has the further advantage or desirable characteristic of maintaining a practically constant seating pressure or contact between the control element of the valve and its co-acting seat, regardless of the specific gravity of the sealing liquid. Hence, in designing a valve of the construction above described, it is not necessary to take into consideration the specific gravity of the liquid used to seal the control element of the valve; or to state it in another way, the counterweights pull the same on the seat F, regardless of the specific gravity of the liquid. Also, the depth of the sealing liquid has no effect on the proper functioning of the rising seat F, inasmuch as the upward movement of said seat is effected by a means separate and distinct from the sealing liquid, that positively pulls the seat upwardly into contact or engagement with a stop formed by the stationarily supported baffle H.

Having thus described my invention, what I claim as new and desire to secure by Letters Patent is:

1. A vent valve provided with a vertically-movable control element, a receptacle containing a body of liquid for sealing said control element when said control element is in its closed position, a seat for said control element that automatically assumes a position above the surface of the liquid during the opening operation of the control element, a stationary part above the surface of the sealing liquid that co-acts with said seat to form a substantially continuous cover for the sealing liquid, disposed so as to prevent the gaseous medium traveling past the control element when said element opens or separates from its seat, from flowing downwardly around the edge of the control element and striking the surface of the liquid, said stationary part being of annular form and extending unbroken around the peripheral edge of the seat when the seat is in engagement with said part.

2. A valve of the kind described in claim 1, in which said stationary part consists of a baffle attached to the side wall portion of the receptacle which holds the sealing liquid for directing escaping gases away from the sealing liquid, and the seat consists of a vertically-movable member, below said baffle, that is normally held submerged in the sealing liquid by the weight of the control element.

3. A vent valve provided with a vertically-movable inverted cup-shaped control element, a receptacle containing a body of liquid for sealing said control element when it is in its closed position, a seat normally submerged in the sealing liquid and adapted to be engaged by the bottom edge of said control element, means separate and distinct from the sealing liquid for causing the seat to rise through said sealing liquid with the control element and assume a position above the surface of the sealing liquid during the opening operation of the control element, a depending part on said seat that always remains submerged in the liquid, and a stationary baffle disposed above the surface of the sealing liquid for directing escaping gases away from the sealing liquid, said baffle acting as a stop to limit the upward movement of the seat.

4. A vent valve provided with a vertically-movable control element, a receptacle containing a body of liquid for sealing said element when said element is in its closed position, a rising seat for said control element that is normally submerged in the liquid by the weight of said control element, and a counterweighting mechanism combined with said seat so as to hold said seat in contact with the control element and cause the seat to rise through the sealing liquid in contact with the control element during the opening operation of said control element, said counterweighting mechanism functioning as a guide cage for the control element, that prevents tipping or tilting of said control element during vertical movement of same.

5. A vent valve provided with a vertically-movable control element, a receptacle containing a liquid for sealing said element when said element is in its closed position, a seat for said control element that is normally submerged in the sealing liquid, and which is adapted to rise with the control element during the opening operation of said element and assume a position above the surface of the sealing liquid, a depending part on said seat that always remains submerged in the sealing liquid, a baffle or shield attached to the side wall portion of the receptacle at a point above the surface of the sealing liquid for directing escaping gases away from the liquid, and arranged so as to serve as a stop which limits the upward movement of said seat.

6. A vent valve provided with a vertically-movable control element, a receptacle containing a body of liquid for sealing said control element when said element is in its closed position, a seat for said element that is normally held submerged in the sealing liquid by the weight of said control element, a counterweighting mechanism that exerts pressure on said seat in a direction tending to move said seat upwardly to a position above the surface of the sealing liquid, and a stop that limits the upward movement of said seat and co-acts with said seat to form a shield or cover which protects the surface of the sealing liquid from the gaseous medium flowing past the control element when said control element opens or separates from its seat.

JOHN H. WIGGINS